United States Patent [19]

Nanstiel, Jr.

[11] 4,253,241
[45] Mar. 3, 1981

[54] BORE GAUGE

[75] Inventor: William F. Nanstiel, Jr., Forest Hills Boro, Pa.

[73] Assignee: Westinghouse Electric Corp., Pittsburgh, Pa.

[21] Appl. No.: 92,868

[22] Filed: Nov. 8, 1979

[51] Int. Cl.³ .......................... G01B 3/46; G01B 5/08
[52] U.S. Cl. ............................ 33/178 R; 33/164 C; 33/174 Q
[58] Field of Search ............ 33/178 R, 174 Q, 174 P, 33/176, 143 R, 178 F, 164 C

[56] References Cited

U.S. PATENT DOCUMENTS

| | | | |
|---|---|---|---|
| 2,135,912 | 11/1938 | Rae | 33/164 C |
| 2,214,633 | 9/1940 | Dillon | 33/178 R |
| 2,311,477 | 2/1943 | Semerak | 33/143 |
| 2,361,336 | 10/1944 | Volis | 33/178 R |
| 2,456,497 | 12/1948 | Forsmark | 33/178 R |
| 2,661,541 | 12/1953 | Dulligan | 33/178 R |
| 2,770,045 | 11/1956 | Oliva | 33/178 R |
| 2,830,375 | 4/1958 | Zwayer | 33/178 R |
| 3,316,649 | 5/1967 | O'Connor | 33/178 R |
| 3,646,685 | 3/1972 | Goodenough | 33/143 R |
| 3,721,012 | 3/1973 | Muller | 33/178 R |
| 3,772,794 | 11/1973 | Hopler, Jr. | 33/178 F |
| 3,959,887 | 6/1976 | Seidel | 33/178 R |

FOREIGN PATENT DOCUMENTS 216190 8/1941 Switzerland .......................... 33/178 R Primary Examiner—Willis Little
Attorney, Agent, or Firm—L. A. DePaul; Z. L. Dermer

[57] ABSTRACT

A bore gauge for measuring the internal diameter of tubes comprises at least two concentrically and rotatably arranged members connected by a helically wound spring member. The spring member is capable of contacting the inside surface of the tube and causing relative rotation of the members thereby indicating the internal diameter of the tube.

6 Claims, 4 Drawing Figures

BORE GAUGE

BACKGROUND OF THE INVENTION

This invention relates to gauges for measuring the inside diameter of bores and more particularly to helically wound bore gauges.

A typical nuclear steam generator comprises a vertically oriented shell, the plurality of U-shaped tubes disposed in a shell so as to form a tube bundle, a tube sheet for supporting the tubes at the ends opposite the U-like curvature, and a dividing plate that cooperates with the tube sheet, forming a primary fluid inlet plenum at one end of the tube bundle and a primary fluid outlet plenum at the other end of the tube bundle. The primary fluid, having been heated by circulation through the nuclear reactor core, enters the steam generator through the primary fluid inlet plenum. From the primary fluid inlet plenum, the primary fluid flows upwardly through first openings in the U-tubes near the tube sheet which supports the tubes, through the U-tube curvature, downwardly through second openings in the U-tubes near the tube sheet and into the primary fluid outlet plenum. At the same time, a secondary fluid, known as feedwater, is circulated around the U-tubes in heat transfer relationship therewith, thereby transferring heat from the primary fluid in the tubes to the secondary fluid surrounding the tubes, causing a portion of the secondary fluid to be converted to steam. Since the primary fluid contains radioactive particles and is isolated from the secondary fluid by the U-tube walls and the tube sheet, it is important that the U-tubes and the tube sheet be maintained defect-free so that no breaks will occur in the U-tubes or in the welds between the U-tubes and the tube sheet, thus preventing contamination of the secondary fluid by the primary fluid.

Occasionally, it is necessary to either inspect or repair the U-tubes or the tube sheet welds by way of access through the primary fluid inlet and outlet plenum. For this purpose, manways are provided in the vertical shell so that working personnel may enter the inlet and outlet plena to perform operations on the U-tubes and the tube sheet. However, since the primary fluid, which is generally water, contains radioactive particles, the inlet and the outlet plena become radioactive which thereby limits the time that working personnel may be present therein. Accordingly, it would be advantageous to be able to perform the inspection operations on the U-tubes as quickly as possible so as to minimize the time that working personnel must be present in the nuclear steam generator.

One type of inspection operation that is performed occasionally on the nuclear steam generators is inspection of the U-tubes to determine if any of the U-tubes have become dented. Denting of the U-tube is thought to be caused by several mechanisms, one of which is corrosion build-up on the outside of the tubes which dents the tubes and causes a constriction in the inside surface. Denting of the U-tubes may lead to cracks in the U-tubes at the dented sight which thereby allows the primary fluid which contains radioactive particles to leak into the secondary fluid through the U-tube walls. This, of course, is an undesirable result which should be prevented.

In order to determine if any of the U-tubes have become dented, occasionally working personnel enter the nuclear steam generator and inspect the U-tubes. Inspection of the U-tubes generally comprises measurement of the internal diameters of the tubes to determine if the tube is dented. There are several mechanisms known in the art that can be used to measure the internal diameter of the U-tubes, however, none of them is completely satisfactory for all purposes. For example, most of the internal diameter gauges suffer from the problem of insufficient durability and need to be replaced often.

Therefore, what is needed is a bore gauge that is capable of inspecting the internal surface of a tube in a nuclear steam generator in a quick and reliable fashion.

SUMMARY OF THE INVENTION

The bore gauge comprises a first cylindrical member having a cap on one end thereof and a second cylindrical member rotatably disposed around the first cylindrical member. A helically wound metal member is attached at one end to the cap and at the other end to the second member so as to be wound around the first member. The bore gauge is capable of being inserted into a tubular member such that when released, the helically wound metal member expands into contact with the inner surface of the tubular member and causes the second member to rotate with respect to the first member. The relative rotation of the second member with respect to the first member can be calibrated so as to give an indication of the internal diameter of the tubular member to be gauged. The bore gauge may be provided with a plurality of helically wound metal members so as to be able to perform more than one measurement at a given time.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

In a tube-type steam generator, a tube sheet supports a bundle of heat transfer tubes. The invention described herein provides a bore gauge that is capable of determining the internal diameter of the heat transfer tubes in the nuclear steam generator.

Figure 1:
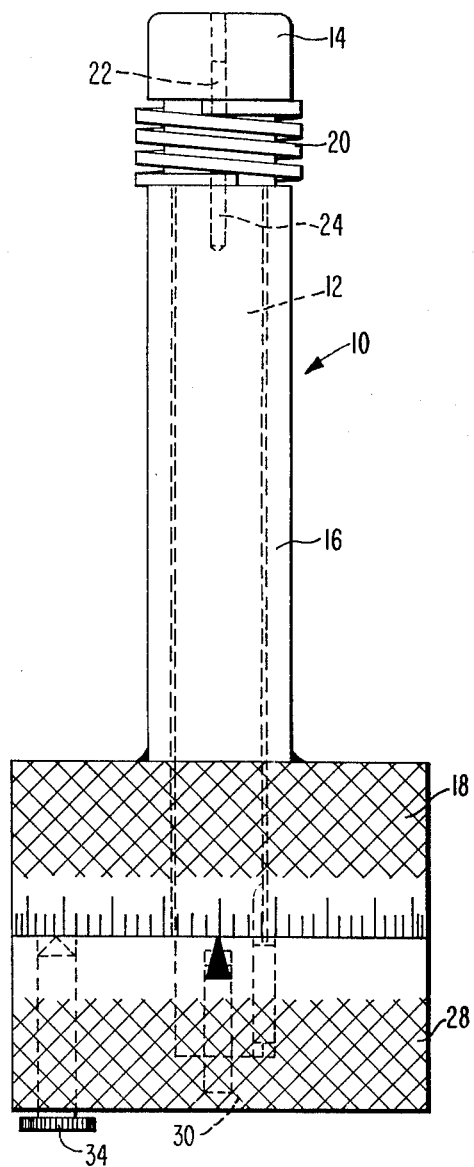
FIG. 1 is a view in elevation of the bore gauge.
Figure 2:
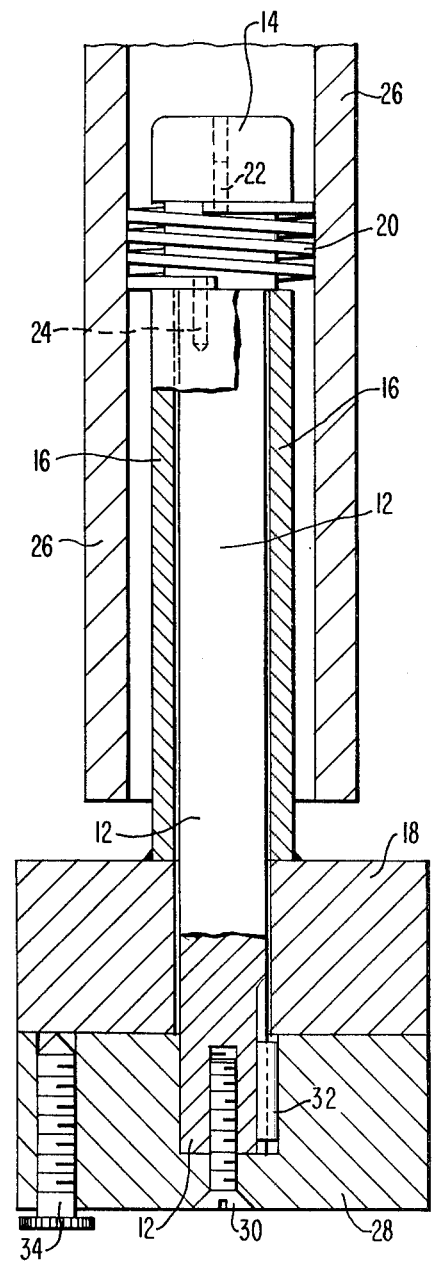
FIG. 2 is a partial cross-sectional view in elevation of the bore gauge disposed in a tubular member.

Referring to FIGS. 1 and 2, the bore gauge is referred to generally as 10 and comprises a cylindrical first member 12 having a cap 14 disposed on one end thereof. A cylindrical second member 16 is rotatably disposed around a portion of first member 12 and has a recording member 18 attached to one end thereof. A metal helically wound spring member 20 is disposed around first member 12 and attached at one end to cap 14 by means of first pin 22 and is attached at the other end thereof to second member 16 by means of second pin 24. Spring member 20 may be a rectangular metal strip having a thickness of approximately 0.10 inches and is helically wound around first member 12 so as to extend beyond the outside diameter of cap 14 and beyond the outside diameter of second member 16. Spring member 20 is arranged so as to be able to contact the inside surface of a tubular member such as tubular member 26 as shown in FIG. 2. Spring member 20 is also arranged such that rotation of second member 16 with respect to first member 12 will contract spring member 20 thus reducing its outside diameter. On the other hand, when second member 16 is rotated relative to first member 12 in the opposite direction, spring member 20 is expanded such that the outside diameter of spring member 20 is increased. Since spring member 20 is chosen to have a spring-like resiliency, spring member 20 is capable of rotating second member 16 with respect to first member 12 when spring member 20 has been contracted and allowed to freely expand.

Still referring to FIGS. 1 and 2, bore gauge 10 also comprises an indicator member 28 attached to first member 12 at the end opposite of cap 14 by means of a screw 30. In addition, a key 32 is attached to both first member 12 and indicator member 28 so that there is no relative rotation of indicator member 28 with respect to first member 12. In addition, a set screw 34 is provided in indicator member 28 such that when it is tightened, it will prevent relative rotation of recording member 18 with respect to indicator member 28. Recording member 18 is provided with graduated marks thereon that can be calibrated to indicate the internal diameter of the tubular member to be measured. Correspondingly, indicator member 28 is provided with an indicating mark so that relative rotation of recording member 18 with respect to indicator member 28 may be observed.

In operation, recording member 18 is manually rotated about first member 12 so as to contract and tighten spring member 20 to a diameter less than the internal diameter of the member to be gauged. At this point, set screw 34 is tightened into contact with recording member 18 which prevents relative motion between recording member 18 and indicator member 28. Bore gauge 10 is then introduced into the tubular member 26. At this point, set screw 34 is unscrewed so that recording member 18 may rotate relative to indicator member 28 while the operator holds indicator member 28. Thus, the tension in spring member 20 causes spring member 20 to expand into contact with the inner surface of tubular member 26. The expansion of spring member 20 causes second member 16 and recording member 18 to rotate relative to first member 12 and indicator member 28 until spring member 20 contacts the inner surface of tubular member 26. A reading can then be taken of the relative rotation of recording member 18 with respect to indicator member 28. Since bore gauge 10 can be calibrated, the relative rotation of recording member 18 with respect to indicator member 28 thereby indicates the internal diameter of tubular member 26 at that particular location. In a similar manner, additional readings may be taken at various locations along the length of tubular member 26 to thereby determine whether or not tubular member 26 has any constrictions therein.

Figures 3, 4:
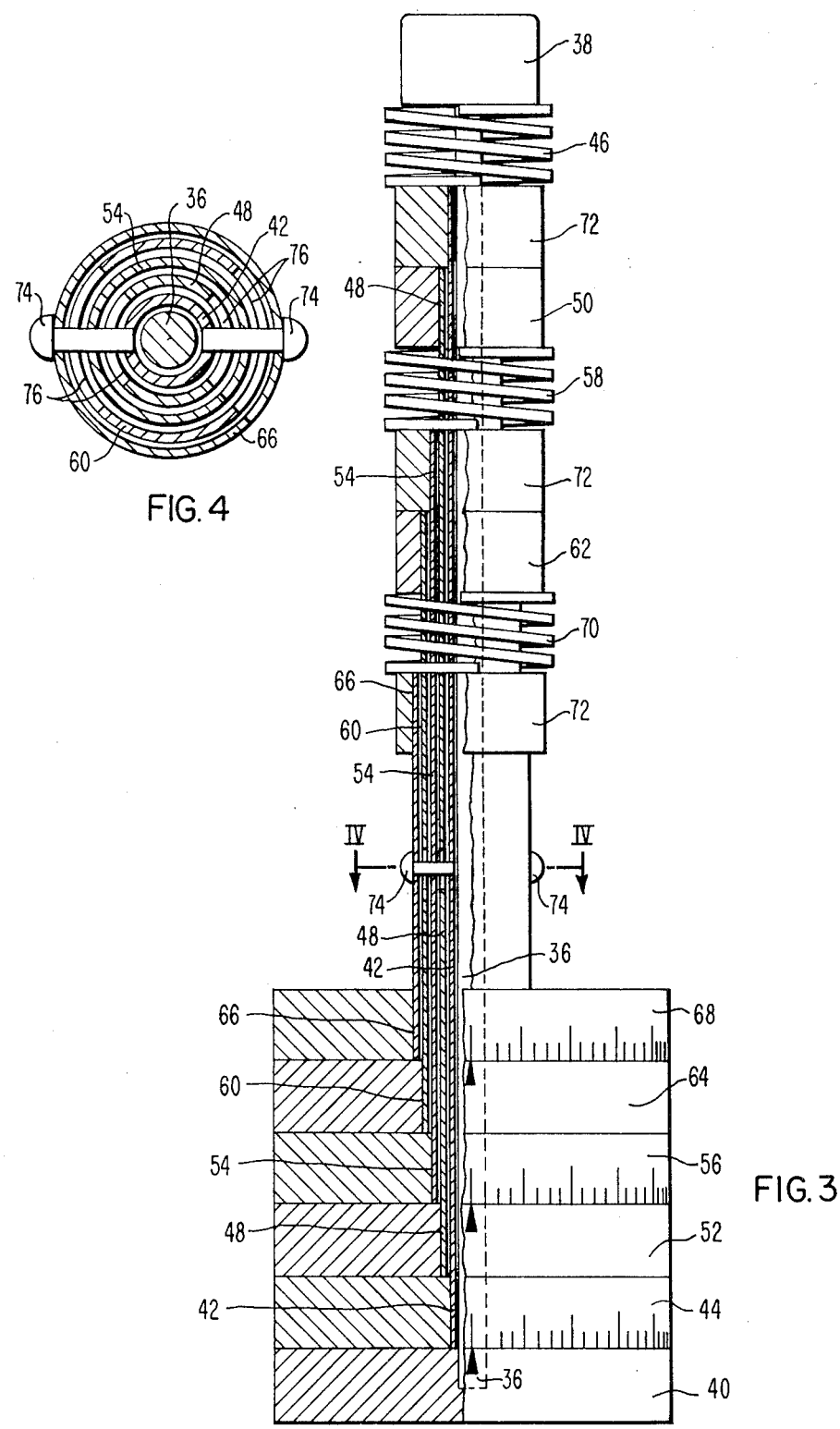
FIG. 3 is a partial cross-sectional view in elevation of a multiple bore gauge.
FIG. 4 is a view along line IV—IV of FIG. 3.

Referring now to FIGS. 3 and 4, a bore gauge for taking multiple readings of the internal diameter of a tubular member comprises a first member 36 having a cap 38 on one end thereof and having a first indicator member 40 on the other end. A second member 42 is rotatably disposed around first member 36 and has a first recording member 44 attached to the end thereof. A first spring member 46 is helically wound around first member 36 and attached at one end to cap 38 and at the other end to second member 42 so that relative rotation of second member 42 with respect to first member 36 will cause first spring member 46 to expand or contract in a manner similar to the bore gauge previously described. The multiple bore gauge also comprises a third member 48 disposed around second member 42 and having a second cap 50 attached to the top end thereof and a second indicator member 52 attached to the lower end thereof. A fourth member 54 is rotatably disposed around third member 48 and has a second recording member 56 attached to its lower end. A second spring member 58 is helically wound around third member 48 and attached at one end to second cap 50 and at the other end to fourth member 54 in a manner similar to that of first spring member 46. A fifth member 60 is rotatably disposed around fourth member 54 and has a third cap 62 attached to its top end and a third indicator member 64 attached to its lower end. A sixth member 66 is rotatably disposed around fifth member 60 and has a third recording member 68 attached to its lower end. A third spring member 70 is helically wound around fifth member 60 and attached at one end to third cap 62 and at the other end to sixth member 66 in a manner similar to that of second spring member 58. In addition, the multiple bore gauge may be provided with several end caps 72 that facilitate attachment of the spring member to the outer rotatable member and also facilitates alignment of the members.

Still referring to FIGS. 3 and 4, the multiple bore gauge is provided with two pins 74 that are attached to sixth member 66, fourth member 54, and second member 42 while passing through slots 76 in fifth member 60 and third member 48. Pins 74 do not contact first member 36 as shown in FIG. 4. In this manner, when all of the spring members have been tightened and the multiple bore gauge placed within a tubular member to be gauged, each of the spring members may move independently of the others while the readings indicated on the recording members will indicate a reading relative to first spring member 46. Thus, multiple readings of a member to be gauged can be taken with this instrument.

As an alternative, a remotely controlled version can be provided with a position sensitive transducer attached to the ends of the spring member, to the indicator member, or to the recording member. In addition, the bore gauge can be provided with a remote torquing device such as a gear motor.

Therefore, it can be seen that the invention provides a helically wound bore gauge for measuring the inside diameter of tubular members.

I claim as my invention:

1. A bore gauge for measuring the internal diameter of a tube comprising:
   a cylindrical first member;
   a cap mounted on one end of said first member;
   an indicator member mounted on the other end of said first member;
   a cylindrical second member rotatably disposed around said first member and terminating short of said cap;
   a recording member attached to one end of said second member and disposed adjacent said indicator member; and
   a helically wound spring member disposed around said first member and attached at one end to said cap and at the other end to said second member for contacting the inside surface of said tube and causing said second member and said recording member to rotate relative to said first member and said indicator member thereby indicating the internal diameter of said tube.

2. The bore gauge according to claim 1 wherein said spring member is disposed between said cap and the end of said second member.

3. The bore gauge according to claim 2 wherein said spring member is a steel spring wire.

4. The bore gauge according to claim 3 wherein said bore gauge further comprises a set screw disposed in said indicator member and near said recording member for selectively contacting said recording member and preventing relative rotation therebetween.

5. A bore gauge for measuring the internal diameter of a tube comprising:
- a cylindrical first member having a first cap attached to one end and a first indicator member attached to the other end;
- a cylindrical second member rotatably disposed around said first member and having a first recording member attached to one end thereof;
- a first helically wound spring member disposed around said first member and attached to one end to said first cap and at the other end to said second member for contacting the inside surface of said tube and causing said second member and said first recording member to rotate relative to said first member and said first indicator member thereby indicating the internal diameter of said tube at a first location;
- a cylindrical third member rotatably disposed around said second member and having a second cap attached to one end and a second indicator member attached to the other end;
- a cylindrical fourth member rotatably disposed around said third member and having a second recording member attached to one end thereof;
- a second helically wound spring member disposed around said third member and attached at one end to said second cap and at the other end to said fourth member for contacting the inside surface of said tube and causing said fourth member and said second recording member to rotate relative to said third member and said second indicator member thereby indicating the internal diameter of said tube at a second location; and
- a pin attached to said fourth member and to said second member while extending through a slot in said third member for allowing said fourth member to rotate relative to said second member thereby indicating an internal diameter of said second location as relative to the internal diameter of said first location.

6. The bore gauge according to claim 5 wherein said spring members are steel spring wires.

* * * * *